March 24, 1964 L. BERMAN 3,126,515

FREQUENCY-STABILIZED OSCILLATION GENERATOR SYSTEM

Filed Nov. 7, 1960 3 Sheets-Sheet 1

LÉON BERMAN
*INVENTOR*

BY Karl F. Ross
AGENT

LÉON BERMAN
INVENTOR

BY Karl F. Ross
AGENT

LÉON BERMAN
INVENTOR
BY Karl F. Ross
AGENT 3,126,515
Patented Mar. 24, 1964

3,126,515

FREQUENCY-STABILIZED OSCILLATION GENERATOR SYSTEM

Léon Berman, Paris, France, assignor to Radio A.I.R. Applications Industrielles Radioelectriques, a corporation of France Filed Nov. 7, 1960, Ser. No. 67,746
Claims priority, application France Nov. 6, 1959
6 Claims. (Cl. 331—22)

This invention relates to apparatus for producing a signal of any desired frequency value from a plurality of signals equispaced frequency values.

An object of the invention is to provide an apparatus of this type wherein the outputs can be selected out of a very large number of different frequencies and wherein each of said outputs will possess high frequency stability.

A consequent object is to provide an apparatus of this type whereby, for a given frequency difference or increment between adjacent frequency values, frequencies ranging over a greatly increased bandwidth can be produced.

It is another object to provide an apparatus of this type which will be relatively simple of design and manufacture, light in weight and small in size.

A further object is to provide an apparatus of this type wherein any desired frequency is obtainable by entering or setting a corresponding number representing the desired frequency in frequency units (e.g. kilocycles per second) in ordinary decimal notation. A consequent object of the invention is to provide apparatus of the type described which will be extremely simple to use and operate even by unskilled personnel.

In accordance with the invention, the desired frequencies are all derived from a frequency-adjustable oscillator, wherein the tuning frequency is controlled from stable-frequency oscillations, different outputs being derived from the oscillator by frequency multiplication, and a frequency multiplier being interposed between the oscillator and a mixer serving to mix the multiplied oscillations with the reference oscillations, and further frequency-stable oscillations being mixed with the output from the first mixing stage to provide a correction factor or error signal serving to control the frequency of the tunable oscillator.

Apparatus according to the invention combines a number of advantageous features: Ease in adjustment resulting from the provision of the dual frequency-multiplying means, whereby identical variations in the oscillator output frequency can be made to correspond with identical degrees of acuation of the frequency-indexing or frequency-displaying means regardless of the position occupied by the output frequency within the frequency band; a high degree of frequency stability resulting from the comparison with the reference frequency; operating simplicity consequent on the provision of a single oscillator having a continuously variable frequency provided with a single frequency-stabilizing device; and, at the same time, wide-band operation made possible by the fact that in addition to the first series of reference frequencies directly mixed with the continuously-variable oscillator output, possibly after frequency multiplication, further series of reference frequencies are brought into action, thereby achieving as an end result the desired close spacing of the available frequency outputs.

In the ensuing exemplary description reference will be made to the accompanying drawing, wherein.

While specific frequency values will be referred to hereinafter for the purpose of clarifying the explanation, it should be understood that such numerical data are not to be interpreted as restricting the scope of the invention.

Figure 1:
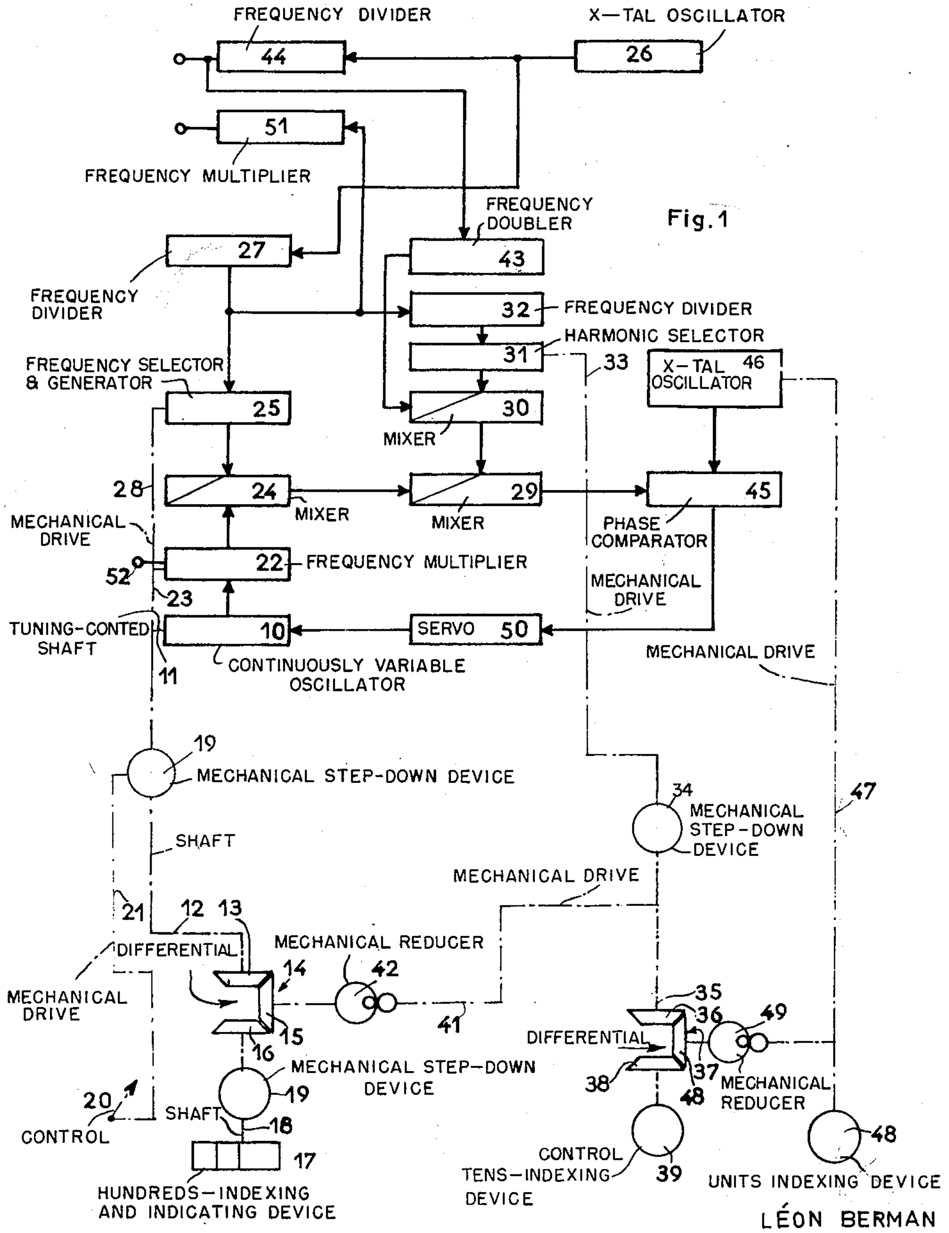
FIG. 1 is a block diagram of one embodiment of the invention.

The embodiment of the invention shown in FIG. 1 comprises an oscillator 10 of the type having a continuously variable output frequency tunable over a range from 2 to 4 mc./sec. (2000 to 4000 kilocycles). Tuning control for the oscillator is effected by rotation of a shaft 11 which is connected for rotation with another shaft 12 secured to the output element 13 of a differential mechanism 14, the other two elements of which are shown at 15 and 16. The differential input element 16 is adapted to be rotated from an actuating member 17, which constitutes an indexing and display member for the hundreds digit of a three-digit decimal number, member 17 being accordingly shown diagrammatically as including three sections which represent the three digital orders of such member. The angular displacement of shaft 18 directly driven from the member 17 is proportional to the numerical indication displayed by member 17, in a fashion similar to a conventional counter. A mechanical divider or step-down device 19 is inserted in the shaft 12. The division factor provided by device 19 is adjustable from a control 20 by way of a drive 21. Alternatively, the actuation of member 17 may provide the required selection.

The output of oscillator 10 is connected to the input of a frequency multiplier 22 providing a multiplication factor which is adjustable through mechanical drive 23, connnected with drive 12, and arranged to introduce a frequency-multiplication factor in frequency multiplier 22 equal to the step-down factor introduced by mechanical divider 19. In the selected example, the factors that can thus be introduced include (in addition to unity) two, four and eight. The output from multiplier 22 is applied to one input of a mixer 24 the other input of which receives the output of a harmonic-selector generator 25. Generator 25 is fed with oscillations 26 from a crystal-stabilized reference oscillator having a high degree of frequency stability, after division in a frequency divider 27. In the example shown the crystal has a frequency of 1 mc./s., and the divider 27 delivers to the harmonics generator and selector 25 a frequency of 100 kc./s. The harmonic selector 25 is adjusted through a mechanical drive 28, connected with drive 23, and so arranged as to provide any selected frequency of a number of frequencies spaced 100-kc./s. increments apart, over a frequency range from 2,900 to 32,900 kc./s., i.e. 2,900, 3,000 . . . 32,800, 32,900 kc./s. The output from the mixer, which is at a frequency constituting the difference between the frequency output of selector 25 and the frequency applied from multiplier 22, has a value in the range from 801 to 900 kc./s.

This resultant or mixed frequency is applied to one input of a second mixer 29 the other input of which receives the output from a third mixer 30. Mixer 30 has one input supplied with the output of a harmonics generator and selector 31 to which is applied a 10-kc./s. frequency supplied by a frequency divider 32 to which is fed the 100-kc./s. output of divider 27. The harmonic-selection process is controlled through a mechanical transmission 33 from one element 36 of a differential 37 the opposite element 38 of which is driven by rotation of a control member 39 which is the tens indexing and display member, the arrangement being such that the angular displacement of element 38 is proportional to the digit (from 0 through 9) displayed on member 39 and constituting the tens digit of the number representing the desired frequency output of the apparatus.

A mechanical divider 24 may be inserted between the transmission 33 and an extension 35 thereof with a view to increasing the closeness of available frequency values.

A mechanical drive 41 interconnecting transmission 33 with the element 15 of differential 14 includes a mechanical reducer 42 introducing a fixed step-down ratio of 1/5.

The harmonic selector 31 thus delivers any one of nine frequencies selected within the group 150, 160 . . . 240 kc./s., depending on the position of control member 39. Mixer 30 receives this selected difference frequency at one input, and the output of a frequency doubler 43 at its other input. To doubler 43 is applied the output of a frequency divider 44 connected with reference oscillator 26 and delivering a 250 kc./s. frequency, so that the frequency applied from doubler 43 to mixer 24 is 500 kc./s. The output of mixer 30 is applied to one input of mixer 29, while the other input of this mixer receives from mixer 30 a frequency within the group 650, 660 . . . 740 kc./s. depending on the number displayed on indexing member 39.

Mixer 29 consequently delivers an output which is approximately 151 kc./s., 152 kc./s., . . . or 160 kc./s. This output frequency is applied to one input of a phase comparator 45 the other input of which is supplied with the output of an oscillator 46 comprising ten control crystals having the respective natural frequencies 151, 152 . . . 160 kc./s., one of these being selected through drive 47 by means of a control member 48, constituting a units indexing and display member, in accordance with the units digit of the number representing the output frequency to be produced. Drive 47 is connected with the intermediate element 48 of the differential device by way of a mechanical reducer gear 49 which introduces a fixed step-down ratio of 1/9. The output of phase comparator 45 provides a feedback error signal to servo-regulator device 50 which controls the frequency of oscillator 10.

Block 51 represents a frequency multiplier which effects a multiplication by three twice, i.e. introduces a multiplication factor of 9 to deliver a 900-kc./s. frequency from the 100-kc./s. output of frequency divider 27.

Assuming that a frequency multiplication factor of 2, for example, is introduced by means of the control 20, whereby the frequency delivered at the output 52 of frequency multiplier 22 to the utilization circuit (not shown) is twice the frequency from oscillator 10, then a predetermined angular displacement imparted to the hundreds indexing member 17 will cause an angular displacement of shaft 11 twice as small as the angular displacement by a similar turn of the control member in the absence of a frequency-multiplication factor introduced by member 20; this is true owing to the provision of the mechanical divider 19. Therefore, the frequency indication still remains true in spite of the frequency-multiplying effect that has occurred at the output. The same remains true if the multiplying factor introduced by means of control 20 is four or eight. Conditions are similar in respect to the indicating of the tens digit of the frequency number by means of member 39, owing to the action of mechanical divider being 34, the divider driven through the transmission 41. The interconnections between mechanical drives 47, 33 and 12 including reducers 49, 42, and in view of the 1/2 ratio introduced by the differential mechanisms, provide the correct relationship between the adjusting means for one digital order and the adjusting means for the next lower digital order. Thus, the transfer from one units digit to the next-higher units digit by actuation of control member 48 rotates shaft 35 through an angular distance equal to one tenth the angular displacement corresponding to the transfer from one tens digit to the next-higher tens digit. Similarly for shaft 12 the corresponding ratio is 1/100.

The apparatus includes but a single oscillator in addition to the reference oscillators, i.e. oscillator 10, and a single servo-regulating device 50. The harmonics used are of sufficiently high order so that the selection of two adjacent harmonics can be effected by simple means. Also contributing to this result is the fact that a fixed frequency is added to the harmonic delivered by selector 31, thereby increasing the frequency without having to resort to harmonics of higher order.

The apparatus utilizes a single crystal having high frequency stability, i.e. the crystal in oscillator 26. The crystals provided in oscillator 46 may have a lesser degree of stability; in view of the low natural frequency of those crystals the resulting accuracy with which the final frequency is obtained will still be highly adequate.

*Example.*—The apparatus described above is used as a pilot transmitter in conjunction with an intermediate-frequency oscillator delivering an intermediate-frequency output of 1150 kc. If a transmitted frequency of say 2,548 kc. is desired, a frequency of 3,698 kc. is delivered by the pilot apparatus. The number "25" is displayed by means of indexing member 17, "4" is displayed on member 39 and "8" on member 48.

Below is a correspondence table between the numerals displayed on member 39 and the frequency, in kilocycles, delivered to mixer 29 from mixer 30.

| | | | | | | | | | |
|---|---|---|---|---|---|---|---|---|---|
| 5 | 6 | 7 | 8 | 9 | 0 | 1 | 2 | 3 | 4 |
| 740 | 730 | 720 | 710 | 700 | 690 | 680 | 670 | 660 | 650 |

The correspondence table between the numerals displayed on the units indexing member 48 and the frequency, in kilocycles, of the reference oscillation from source 46 is as follows:

| | | | | | | | | | |
|---|---|---|---|---|---|---|---|---|---|
| 0 | 1 | 2 | 3 | 4 | 5 | 6 | 7 | 8 | 9 |
| 160 | 159 | 158 | 157 | 156 | 155 | 154 | 153 | 152 | 151 |

As an example, if it is desired that the apparatus described should deliver a frequency of 3,698 kilocycles, the harmonic-selector generator 25 is adjusted to deliver an output at 4.5 mc. The output frequency from mixer 24, with multiplier 22 adjusted to provide the multiplication factor of unity, is about 802 kilocycles. The output frequency from harmonic-selector generator 31 is 150 kilocycles and, when mixed in mixer 30 with the fixed 500-kilocycle frequency, yields the resulting frequency of 650 kilocycles. The output frequency from mixer 29, which is the difference between the one input frequency of 802 kc. and the other input frequency of 650 kc., therefore approximates 152 kc., and can be compared in phase with the selected 152 kc. frequency delivered by crystal oscillator 46. By mixing with the output of generator 10 (taken from terminal 52) with the intermediate frequency of 1,150 kc., which is available from the combined outputs of circuits 44 and 51, a transmitted frequency of 2,548 kc. is obtained. The indexing members are indexed to display "25" at the hundreds member, "4" at the tens member and "8" at the units member.

In a modified embodiment, the reference frequencies, spaced 1 kc. increments apart, are derived from the output of oscillator 26, so that oscillator 46 can be omitted. This modification is of interest in cases where the requisite frequency stability is higher than that obtainable by the embodiment described above.

Further embodiments will now be described including radio loop circuits capable of being controlled in frequency in the general manner disclosed above, so as to deliver at their outputs frequency spectra of uniform density.

Figure 2:
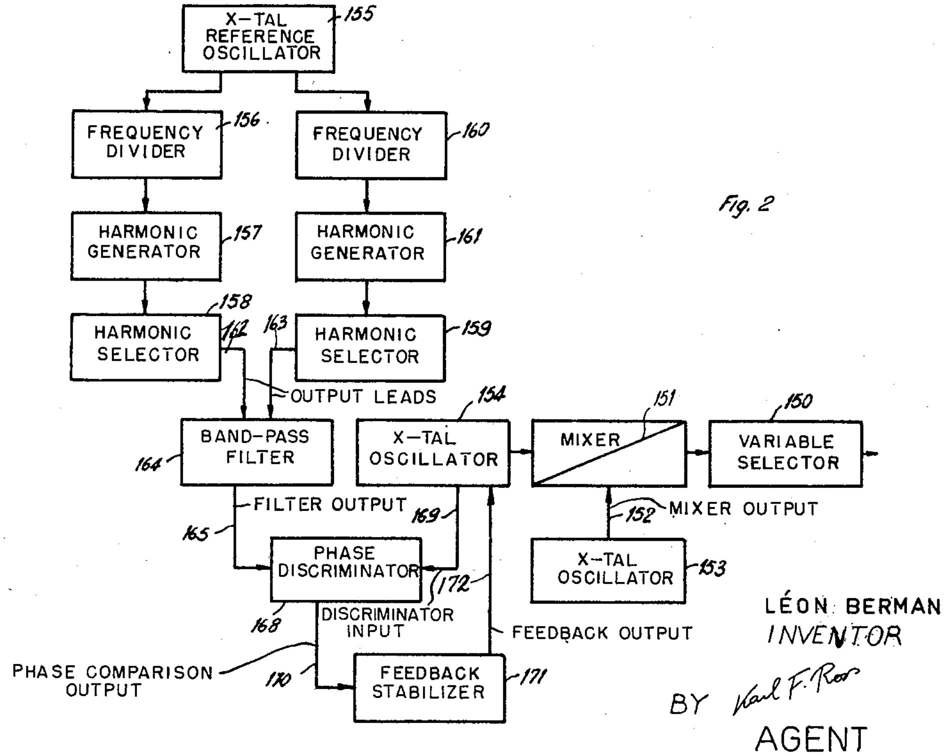
FIG. 2 is a similar block diagram showing a modified embodiment and omitting the components serving for frequency control and the associated connections.

Reference is now made to FIG. 2. In this embodiment, any selected stabilized frequency expressible as an integral number of kilocycles is delivered, within the 700 to 800-kilocycle band for example, by a variable selector device 150 which is supplied with the output from a mixer 151. One input of the mixer is supplied with the output from any one of the ten crystals of an oscillator 153 which is able to deliver ten frequencies spaced by one-kilocycle increments from 91 through 100 kilocycles. The second input to mixer 151 receives any one of the frequencies from a ten-crystal oscillator 154 delivering ten frequencies spaced by 10-kilocycle increments from 610 through 700 kilocycles, the latter oscillator being frequency-stabilized from the reference crystal of a highly stable oscillator device 155 tuned to 1-megacycle frequency. The oscillator device 155 serves to provide, by way of a frequency divider 156 followed by a harmonic generator 157 and a harmonic selector 158, a frequency spectrum in 10-kilocycle increments. A frequency spacing of 100 kc./s. increments is provided by the selector 159 which follows a frequency divider 160 and a harmonic generator 161. The desired frequencies delivered by selectors 158 and 159 are applied by leads 162 and 163 respectively to a bandpass filter 164 delivering at its output 165 a highly stable frequency expressible as an integral multiple of 10 kilocycles in the range from 600 through 700 kilocycles. Said frequency is used in a phase discriminator 168 as a reference input for the substantially similar frequency delivered by the unit 154 and applied to the other input of the discriminator by lead 169. The phase-comparison output signal from the discriminator is applied over a lead 170 to a feedback or servo device 171 delivering an output which is returned over the lead 172 to the oscillator 154 to control the frequency output thereof. Feedback device 171 may comprise any of a number of suitable devices well-known in the art, such as magnetic amplifiers, variable reactors, variable capacitors using semiconductors or the like. The oscillations thus made available at the output from the variable selector 150 are advantageously combined with the oscillations supplied from a loop circuit at substantially higher frequency for controlling the output frequency of a continuously variable-frequency wide-band oscillator, adjustable in kilocycle increments, comprising a circuit which may be similar to that described above in connection with FIG. 1, or a circuit as disclosed hereinafter.

This invention further comprises a simplified construction of the loop circuit shown in FIG. 2, wherein the means for controlling the frequency of oscillator 154 are omitted. Such simplified circuit is usable in cases where the degree of frequency stability required for the system as a whole is not especially high.

Figure 3:
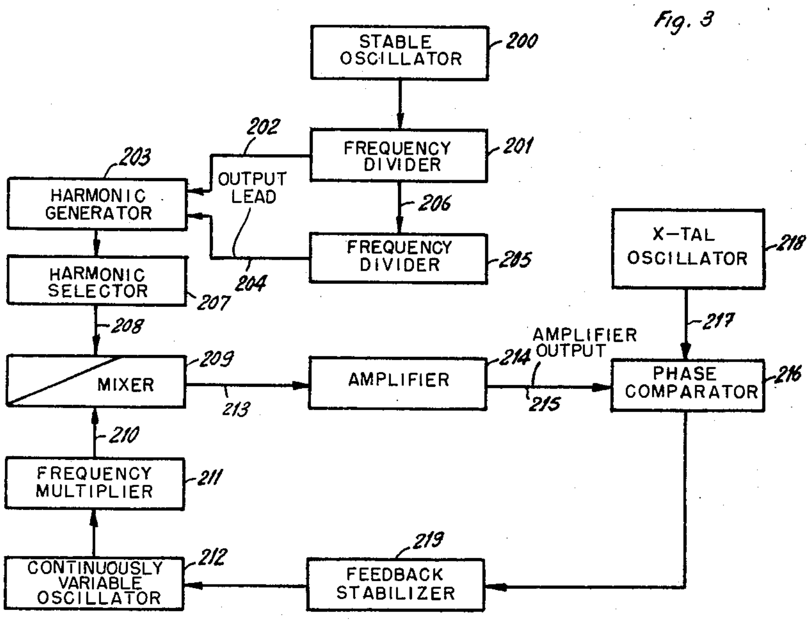
FIG. 3 is similar to FIG. 2, showing a further modification.

In the embodiment shown in FIG. 3, the highly stable oscillator 200, the crystal of which is tuned to a frequency of 1 megacycle, has its output connected to a frequency divider 201 which introduces a division factor of 10. The divider 201 has a lead 202, representing one of its two outputs, connected to one input of a modulator 203 the other input of which is supplied with the output from a lead 204 of a further frequency divider 205 connected to another output 206 of the first divider 201, divider 205 provides a further division factor of 10. Modulator 203 is followed by a harmonics generator and selector 207 which is able to deliver any frequency expressible as an integral multiple of 10 kc., from 2.15 through 32.15 mc. The output lead 208 of harmonic generator 207 is connected to one input of a mixer 209 having its other input supplied with the output from a lead 210 of a frequency multiplier 211 connected to the oscillator 212 which has a continuously variable frequency output in the range from 2 to 4 megacycles. The output from lead 213 of mixer 209 is applied to an amplifier 214 delivering a frequency expressible as an integral number of kilocycles from 151 through 160 kc. The output from lead 215 of amplifier 214 is applied to a phase-comparison circuit 216 which is also supplied through lead 217 with the output, at the same nominal frequency, of an oscillator 218 comprising a set of 10 crystals at frequencies equally spaced by 1-kc. increments from 151 through 160 kc. The output of the phase comparator controls a feedback device 219 controlling the frequency of oscillator 212.

Figure 4:
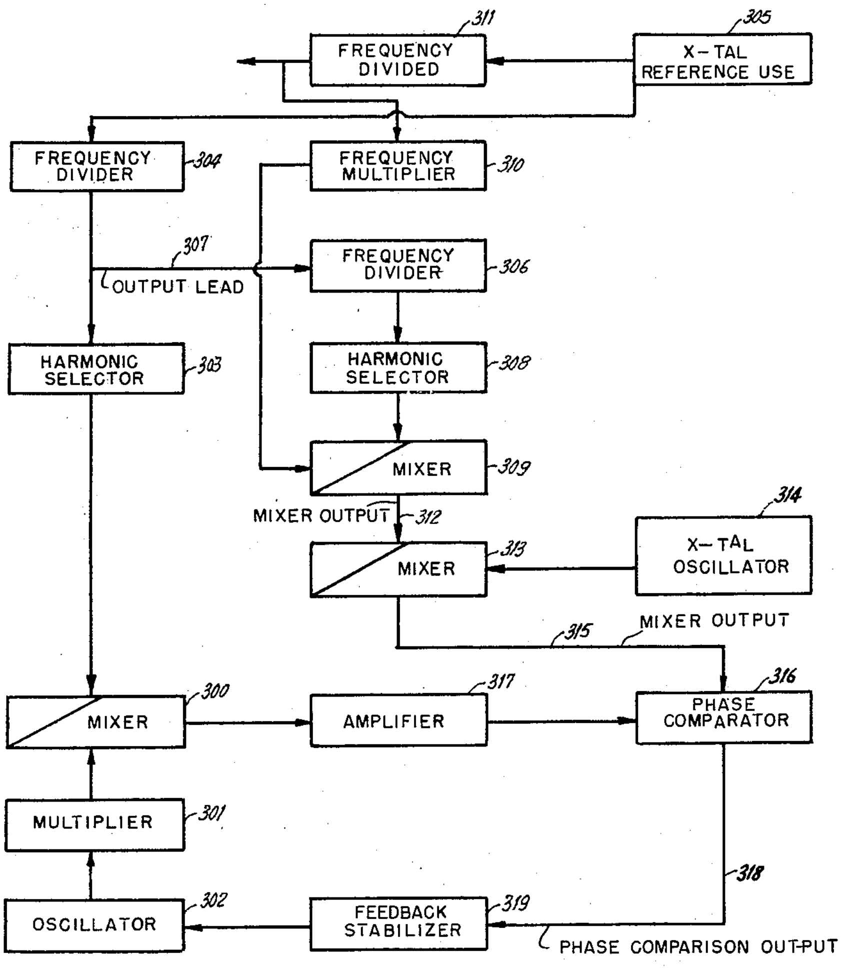
FIG. 4 illustrates yet another modification of the invention.

Reference will now be made to FIG. 4. In this embodiment, the mixer 300 has one input supplied with the output of multiplier 301 which is supplied from the oscillator 302 to be stabilized. The other input of the mixer is supplied with a harmonic output from a harmonics generator and selector 303 adapted to deliver any harmonic frequency expressible as an integral multiple of 100 kc. from 2.9 through 32.9 megacycles. The 100-kc. input applied to generator 303 is derived from a frequency divider 304 supplied from the reference crystal oscillator 305 tuned to a stable frequency of 1 megacycle. The 10-kilocycle frequencies are derived from a frequency divider 306 connected by lead 307 to the output of divider 304 and introducing the same division factor of 10 as the latter divider. Divider 306, which thus delivers a 10-kc.-frequency output, is followed by a harmonic-selector generator 308 delivering frequencies uniformly separated by 10-kc. increments from 150 through 240 kc., this selector working into an input of a mixer 309 which at its other input receives a 500-kc. frequency supplied by a frequency multiplier 310 introducing a multiplication factor of 2, the input of multiplier 310 being and which has its input connected to the output of a divider 311, introducing a division factor of 4, directly supplied from oscillator 305. The output lead 312 of mixer 309 delivers a frequency expressible as an integral multiple of 10 kc. from 650 through 740, and is connected to one input of a further mixer 313 which receives at its other input an output frequency from an oscillator 314 including a set of ten crystals respectively tuned to 151, 152 and so on through 160 kc. The output frequency at lead 315 of mixer 313 is expressible as any integral number of kilocycles from 801 through 900, and is applied to a phase-comparison circuit 316 which receives, through a selector amplifier 317, the mixed output frequency from mixer 300. The output signal from the phase-comparison circuit is applied by lead 318 to a feedback device 319 which controls the frequency of oscillator 302.

In a further modification, not illustrated, the chain delivering the frequency spectrum spaced by 10-kc. increments from 650 through 740 kc. may be omitted and instead a ten-crystal oscillator may be used. This oscillator may, if desired, be synchronized by connection with the reference crystal oscillator.

What I claim is:

1. A system for generating a spectrum of stabilized output frequencies which are separated from each other by a predetermined unit of frequency over a wide frequency band, said system comprising a variable oscillator having a continuously variable frequency over a band having a width which is a sub-multiple of said wide frequency band and having a low-frequency limit which is substantially equal to that of said wide frequency band; frequency-selector means operatively coupled with said variable oscillator; means for driving said frequency-selector means and consisting of operating means for manually actuating said frequency-selector means and a mechanical transmission system interposed between said operating means and said frequency-selector means; mechanical divider means having an adjustable division factor interposed in said transmission system; adjustable frequency-multiplier means connected with said oscillator for receiving the oscillations supplied by said oscillator and having two outputs at one of which the generated oscillations are collected, said multiplier means having an adjustable electronic multiplication factor; means for adjusting to the same value the electronic multiplication factor of said frequency-multiplier means and the division factor of said mechanical divider; and a frequency-stabilizing device connected to a second output of said frequency-multiplier means, said device comprising means for producing reference frequencies which can be regulated from said frequency-selector means, and frequency-comparison means for regulating the frequency of said adjustable oscillator in dependence upon comparison of said reference frequences with the frequency derived from said frequency-multiplier means.

2. A frequency-stabilized radio-wave generator for producing oscillations in steps of 1 kc./sec. over a frequency band having a width of several thousand kc./sec. comprising a single variable oscillator having a continuously variable frequency over a band having a band-width which is a submultiple of the first-mentioned band and a lower limit which is substantially equal to the lower limit of said first-mentioned band; mechanical frequency-determination means for said oscillator; a frequency-control device comprising a first control knob assigned to the control of unit frequencies, a second control knob assigned to the control of tens frequencies, and a third control knob assigned to the control of hundreds frequencies, a transmission system interposed between said control knobs and said frequency-determination means and including a mechanical divider with an adjustable division factor; a frequency-multiplier coupled with said oscillator and at the output of which the resultant oscillations are collected, said multiplier having an adjustable multiplication factor; an operating member for adjusting the multiplication factor of said frequency-multiplier and the division factor of the mechanical divider to the same value; a frequency-stabilizing device comprising means for supplying a first spectrum of stabilizing frequencies in steps of one hundred kc./sec., a second spectrum of ten stabilizing frequencies in steps of ten kc./secs., and a third spectrum of ten stabilizing frequencies in steps of one kc./sec.; means operated by said knobs controlling the hundreds frequencies, the ten frequencies and the unit frequencies for respectively selecting one frequency from each of the three last-named spectra respectively; and means responsive to the selected stabilizing frequencies for stabilizing the frequency of the continuous variable-output oscillator.

3. A system for generating a spectrum of stabilized and equispaced output frequencies, comprising a continuously variable oscillator for supplying any desired frequency in a frequency band having a width which is substantially a submultiple of the width of a predetermined spectrum, the lower limit of which is substantially equal to that of said band; a frequency-multiplier fed from said continuously variable oscillator and having an adjustable electronic frequency-multiplication factor, the highest multiplication factor bringing the maximum frequency of the oscillator substantially to the upper limit of said predetermined spectrum; mechanical means for adjusting the frequency-multiplication factor of said frequency-multiplier; a control unit coupled with said oscillator for selecting the output frequency thereof; operating means for controlling the frequency of said continuously variable oscillator, said operating means comprising operating means for mechanically adjusting said oscillator, and transmission means interposed between said operating means and said control unit; first means for generating stable-frequency spectra in unit steps and combinations of frequencies associated with the various unit spectra to permit reconstitution of the frequency spectrum to be generated; second means for regulating the frequency generated by said oscillator by comparison with a frequency which closely aproximates said combination; third means for selecting the comparison frequency from said first means; a mechanical divider interposed in the transmission system between said control unit and the continuously variable oscillator; and fourth means for controlling the division factor of said mechanical divider from the control unit so as to ensure that the mechanical division factor is continuously equal to the electronic frequency-multiplication factor.

4. A system for generating stabilized frequencies which are uniformly separated in steps of one-unit frequency over a wide band of several tens of thousands of units of frequency, said system comprising a continuously variable oscillator for producing input oscillations, the band of variation of said input oscillations being substantially a submultiple of said wide band of frequency to be generated; a frequency-multiplier fed with said input oscillations and having an adjustable electronic frequency-multiplication factor; operating means for the adjustment of said multiplication factor of the frequency-multiplier and a first mechanical transmission system between said operating means and said frequency-multiplier; a device for controlling the frequency of said variable oscillator, said device comprising a second mechanical transmission system terminating in said oscillator, a first member for controlling the hundreds frequencies driving said second transmission system in accordance with a number representing the hundreds frequency increments of the frequency to be generated, a second member for controlling the tens frequencies driving said second transmission system in accordance with a number representing the unit frequency increments of the frequency to be generated; a mechanical divider interposed in said second transmission system; means interconnecting said transmission system for adjusting the mechanical division factor which is introduced by said divider to the value of the electronic frequency-multiplication factor of said frequency-multiplier; means for generating a stable comparison frequency of substantially the output frequency of the continuously variable oscillator, the last-mentioned means comprising first means for supplying a first spectrum of frequenies in steps of 100 units of frequency, a second means for supplying a second spectrum of frequencies in steps of 10 frequency units, and third means for supplying a third spectrum of frequencies in steps of 1 unit of frequency; means for mixing a selected frequency of said first spectrum, a selected frequency of said second spectrum and a selected frequency of the third spectrum, the selected frequency of each of said spectra being determined respectively by said member controlling the hundreds frequencies, by said member controlling the tens frequencies, by said member controlling the unit frequencies.

5. A system for generating a stabilized frequency forming part of a wide frequency spectrum, the frequencies of which are in steps of 1 unit of frequency, said system comprising a continuously variable oscillator having a frequency range which is substantially a submultiple of the width of said spectrum; means for controlling the frequency of oscillations supplied by said continuously variable oscillator in dependence upon a stable frequency by the combination of a selected frequency of a first spectrum of stable frequencies in steps of ten units of frequency with a selected frequency in steps of one unit of frequency; a frequency-multiplier connected to the output of said continuously variable oscillator and having two outputs, one of which comprises the usable frequencies and the other of which comprises said selected frequencies; a mixer for combining said selected frequencies, said multiplier having an adjustable frequency-multiplication ratio; an operating device for driving said oscillator thereby controlling the output frequency of said continuously variable oscillator, said device comprising a mechanical transmission system for adjusting said oscillator, a mechanical divider with an adjustable division ratio interposed in said transmission system; means for adjusting the frequency-multiplication ratio of said frequency-multiplier and the division ratio of said mechanical divider to the same value; means including said transmission system for selecting the selected frequency introduced into said mixer and forming part of said first spectrum; and means for driving said transmission system as a function of a number representing the units of frequency of the frequency to be generated and for concurrently selecting the stable frequency of said second spectrum.

6. A system for generating a wide band of stabilized frequencies in steps of one unit of frequency, said system comprising an oscillator providing a continuous variation of frequency over another band which is substantially narrower than the first-mentioned band and has substantially the same lower limit as the latter, a frequency-multiplier fed from said oscillator and having an electronic frequency-multiplication factor which is adjustable up to a value which, by multiplying the upper limit of the band of frequency-variation of the continuous oscillator supplies the upper limit of said first-mentioned spectrum, the oscillations generated by the system being tapped at an output of said frequency-multiplier; a first mixer to which are applied the output oscillations of said frequency-multiplier; a first device supplying a first spectrum of stable frequencies in steps of 100 units of frequency and the output which is applied to said first mixer; a second mixer fed by said first mixer; a second device for supplying a second spectrum of 10 stable frequencies in steps of 10 units of frequency and which are applied to said second mixer; frequency-comparison means fed by said second mixer; a third device for supplying a third spectrum of 10 frequencies in steps of one unit of frequency and applied to said frequency-comparison means; means for regulating the frequency of said continuous oscillator in dependence upon the comparison between the frequencies applied to said frequency-comparison means; a frequency-control device comprising control means adjusting the frequency of said continuously variable oscillator; means for driving said control means comprising first means for selecting a frequency from the hundreds frequencies, second means for selecting a frequency from the tens frequencies and third means for selecting the frequencies from the single unit frequencies, a mechanical divider interposed between said first, second and third selecting means and said control means; said mechanical divider being of adjustable division-factor type; and means for adjusting to the same value the electron multiplication factor of said frequency-multiplier and the mechanical division factor of said mechanical divider, said first selecting means assigned to the hundreds frequencies serving to select one frequency from the first spectrum, the selecting means assigned to the tens frequencies serving to select one frequency from the second spectrum and the selecting means assigned to the single unit frequencies serving to select one frequency from the third spectrum for feeding said mixers.

References Cited in the file of this patent

UNITED STATES PATENTS 2,581,594 MacSorley ............... Jan. 8, 1952
2,751,500 Robinson ............... June 19, 1956